United States Patent
Lee et al.

(10) Patent No.: US 10,339,253 B2
(45) Date of Patent: Jul. 2, 2019

(54) METHOD OF YIELD PREJUDGMENT AND BUMP RE-ASSIGNMENT AND COMPUTER READABLE STORAGE MEDIUM

(71) Applicant: Industrial Technology Research Institute, Hsinchu (TW)

(72) Inventors: Chi-Han Lee, Kaohsiung (TW); Ding-Ming Kwai, Hsinchu County (TW); Chang-Tzu Lin, Hsinchu County (TW); I-Hsuan Lee, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 71 days.

(21) Appl. No.: 15/831,232

(22) Filed: Dec. 4, 2017

(65) Prior Publication Data

US 2019/0121930 A1 Apr. 25, 2019

(30) Foreign Application Priority Data

Oct. 25, 2017 (TW) .............................. 106136690 A

(51) Int. Cl.
*G06F 17/50* (2006.01)
*G06F 17/18* (2006.01)
*H01L 23/00* (2006.01)

(52) U.S. Cl.
CPC .......... *G06F 17/5072* (2013.01); *G06F 17/18* (2013.01); *G06F 2217/78* (2013.01); *H01L 24/05* (2013.01); *H01L 24/16* (2013.01); *H01L 24/17* (2013.01); *H01L 2224/05005* (2013.01); *H01L 2224/1601* (2013.01); *H01L 2224/1713* (2013.01); *H01L 2224/1716* (2013.01); *H01L 2224/17177* (2013.01);
(Continued)

(58) Field of Classification Search
CPC ............................ G06F 17/5072; G06F 17/18
USPC ........................................................ 716/120
See application file for complete search history.

(56) References Cited

U.S. PATENT DOCUMENTS

| 7,601,559 B2 | 10/2009 | Cisneros et al. |
| 8,365,611 B1 | 2/2013 | Darveaux et al. |
| 8,966,427 B2 | 2/2015 | Guthaus et al. |

(Continued)

FOREIGN PATENT DOCUMENTS

| CN | 101581573 B | 6/2012 |
| CN | 104253105 | 12/2014 |

(Continued)

OTHER PUBLICATIONS

Taiwan Patent Office, Notice of Allowance, Patent Application Serial No. 106136690, dated Apr. 27, 2018, Taiwan.

(Continued)

*Primary Examiner* — Suchin Parihar

(57) ABSTRACT

A method of yield prejudgment and bump re-assignment for a die is provided. The die includes a plurality of areas. Each area is electrically connected to a substrate through a corresponding bump. The successful-connection probability of each area is prejudged. The die is divided into a signal region and a short-circuit region according to the successful-connection probabilities. The positions of the bumps are arranged so that signal bumps are disposed in the signal region and power bumps are disposed in the short region.

10 Claims, 5 Drawing Sheets

(52) U.S. Cl.
CPC ............ *H01L 2224/17179* (2013.01); *H01L 2924/37001* (2013.01); *H01L 2924/381* (2013.01)

(56) References Cited

U.S. PATENT DOCUMENTS

| | | | |
|---|---|---|---|
| 2009/0057866 A1 | 3/2009 | Chow | |
| 2011/0156304 A1* | 6/2011 | Walker | B23P 15/24 264/219 |
| 2013/0056861 A1* | 3/2013 | Gao | H01L 23/13 257/675 |

FOREIGN PATENT DOCUMENTS

| | | |
|---|---|---|
| CN | 105488263 A | 4/2016 |
| TW | I259545 | 8/2006 |
| TW | I461056 | 11/2014 |
| TW | I579942 | 4/2017 |

OTHER PUBLICATIONS

E. Chiprout, "Fast Flip-chip Power Grid Analysis Via Locality and Grid Shells," IEEE/ACM International Conference on Computer Aided Design (ICCAD-2004), Nov. 2004, pp. 485-488, IEEE, US.

V.D. Khanna et al., "Impact of Organic Substrate Warp on C4 Non-Wets," IEEE Transactions on Components, Dec. 2011, pp. 1947-1949, vol. 1, No. 12, IEEE, US.

P. Zhou et al., "Placement Optimization of Power Supply Pads Based on Locality," Design, Automation & Test in Europe Conference & Exhibition, Mar. 2013, pp. 1655-1660, IEEE, US.

S. Logan et al., "Redundant C4 Power Pin Placement to Ensure Robust Power Grid Delivery," IEEE 56th International Midwest Symposium on Circuits and Systems (MWSCAS), Aug. 2013, pp. 449-452, IEEE, US.

K. Sakuma, et al., "An Enhanced Thermo-compression Bonding Process to Address Warpage in 3D Integration of Large Die on Organic Substrates," 2015 IEEE 65th Electronic Components and Technology Conference (ECTC), May 2015, pp. 318-324, IEEE, US.

Y. Shen, L. Zhang et al., "Finite-element Analysis and Experimental Test for a Capped-die Flip-chip Package Design," IEEE Trans. Components, Packaging and Manufacturing Technology, Sep. 2016, pp. 1308-1316, vol. 6, No. 9, IEEE, US.

Y. M. Lee et al., "Yield-driven Redundant Power Bump Assignment for Power Network Robustness," 2017 $22^{nd}$ Asia and South Pacific Design Automation Conference (ASP-DAC), Jan. 2017, pp. 269-274, IEEE, US.

* cited by examiner

FIG. 6

METHOD OF YIELD PREJUDGMENT AND BUMP RE-ASSIGNMENT AND COMPUTER READABLE STORAGE MEDIUM

CROSS REFERENCE TO RELATED APPLICATIONS

This Application claims priority of Taiwan Patent Application No. 106136690, filed on Oct. 25, 2017, the entirety of which is incorporated by reference herein.

BACKGROUND OF THE INVENTION

Field of the Invention

The invention relates to a method of bump assignment, and more particularly to a method of yield prejudgment and bump re-assignment.

Description of the Related Art

FIG. 1 is a cross-sectional view of an integrated circuit (IC) after being packaged. As shown in FIG. 1, the integrated circuit 100 comprises a die 110 and a substrate 120. The die 110 has a plurality of circuits (not shown) and a plurality of metal pads 131-134. The metal pads 131-134 are electrically connected to the substrate 120 through the respective bumps 141-144. The substrate 120 outputs signals and/or power levels related to an external circuit to the circuits of the die 110 through the bumps 141-144 and the metal pads 131-134. Furthermore, the substrate 120 may outputs signals and/or power levels provided by the circuits of the die 110 to the external circuit through the bumps 141-144 and the metal pads 131-134. The external circuit is disposed outside of the integrated circuit 100.

However, a phenomenon known as warpage may occur between the die 110 and the substrate 120 due to the high temperature of the packaging process. As shown in FIG. 1, at the center of the die 110, the distance between the die 110 and the substrate 120 is too long, so the bump 142 cannot be electrically connected to the substrate 120, resulting in an open circuit. In addition, since the distance between the die 110 and the substrate 120 is too close on the right side of the die 110, the bumps 143 and 144 are electrically connected to each other, thus resulting in a short circuit. When a short circuit or an open circuit occurs between the die 110 and the substrate 120, the substrate 120 will not be able to normally transmit signals and/or power levels to the external circuit, such that the die 110 cannot operate normally.

BRIEF SUMMARY OF THE INVENTION

An exemplary embodiment of a method of yield prejudgment and bump re-assignment for a die is provided. The die comprises a plurality of areas. Each area is electrically connected to a substrate through a bump. The method comprises the steps of calculating the probability for the occurrence of warpage in each area to obtain the successful-connection probability for the area; defining a part of the areas as a short-circuit region according to the successful-connection probabilities, wherein the successful-connection probabilities of the areas of the short-circuit region are not within a predetermined range; arranging the areas excluding the areas of the short-circuit region and the areas located at corners of the die in a descending order from high to low according to the corresponding successful-connection probabilities; defining a part of the areas which are arranged in the descending order as a signal region, wherein the successful-connection probabilities of the areas of the signal region are greater than a predetermined value; dividing the short-circuit region into at least one power region and at least one ground region; determining whether the number of areas in the power region is less than a first required value and whether the number of areas in the ground region is less than a second required value; when the number of areas in the power region is less than the first required value, assigning at least one area among the areas arranged in the descending order to the power region, wherein the successful-connection probability of the area assigned to the power region is less than the predetermined value; and when the number of areas in the ground region is less than the second required value, assigning at least one area among the areas arranged in the descending order to the ground region, wherein the successful-connection probability of the area assigned to the ground region is less than the predetermined value.

An exemplary embodiment of a computer-readable storage medium is provided. The computer-readable storage medium stores a computer program to perform a method of yield prejudgment and bump re-assignment to define the functions of a plurality of pumps. The pumps are electrically connected to a plurality of areas of a die and a substrate. The method comprises calculating the probability of warpage occurring in each area to obtain the successful-connection probability of the area; defining the areas whose successful-connection probabilities are not within a predetermined range as a short-circuit region; arranging the areas excluding the areas of the short-circuit region and the areas located at corners of the die in a descending order from high to low according to the corresponding successful-connection probabilities; among the areas arranged in the descending order, defining the areas whose successful-connection probabilities, among the areas arranged in the descending order, are greater than a predetermined value as a signal region; dividing the short-circuit region into at least one power region and at least one ground region; determining whether the number of areas in the power region is less than a first required value and whether the number of areas in the ground region is less than a second required value; when the number of areas in the power region is less than the first required value, assigning at least one area whose successful-connection probabilities is less than the predetermined value, among the areas arranged in the descending order, to the power region; and when the number of areas in the ground region is less than the second required value, assigning at least one area whose successful-connection probabilities is less than the predetermined value, among the areas arranged in the descending order to the ground region.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6 is a schematic view of areas of a die according to an exemplary embodiment.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
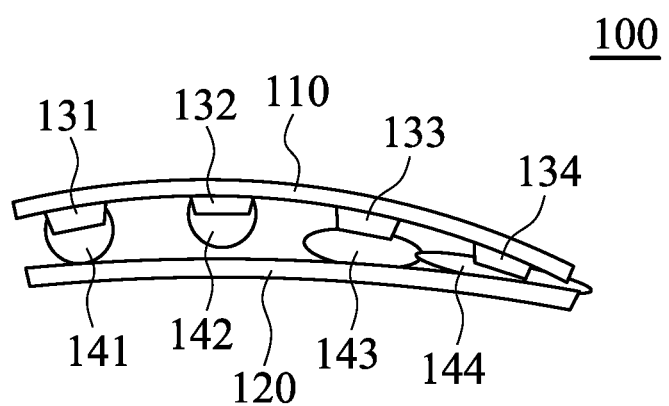
FIG. 1 is a cross-sectional view of an integrated circuit.
Figure 2:
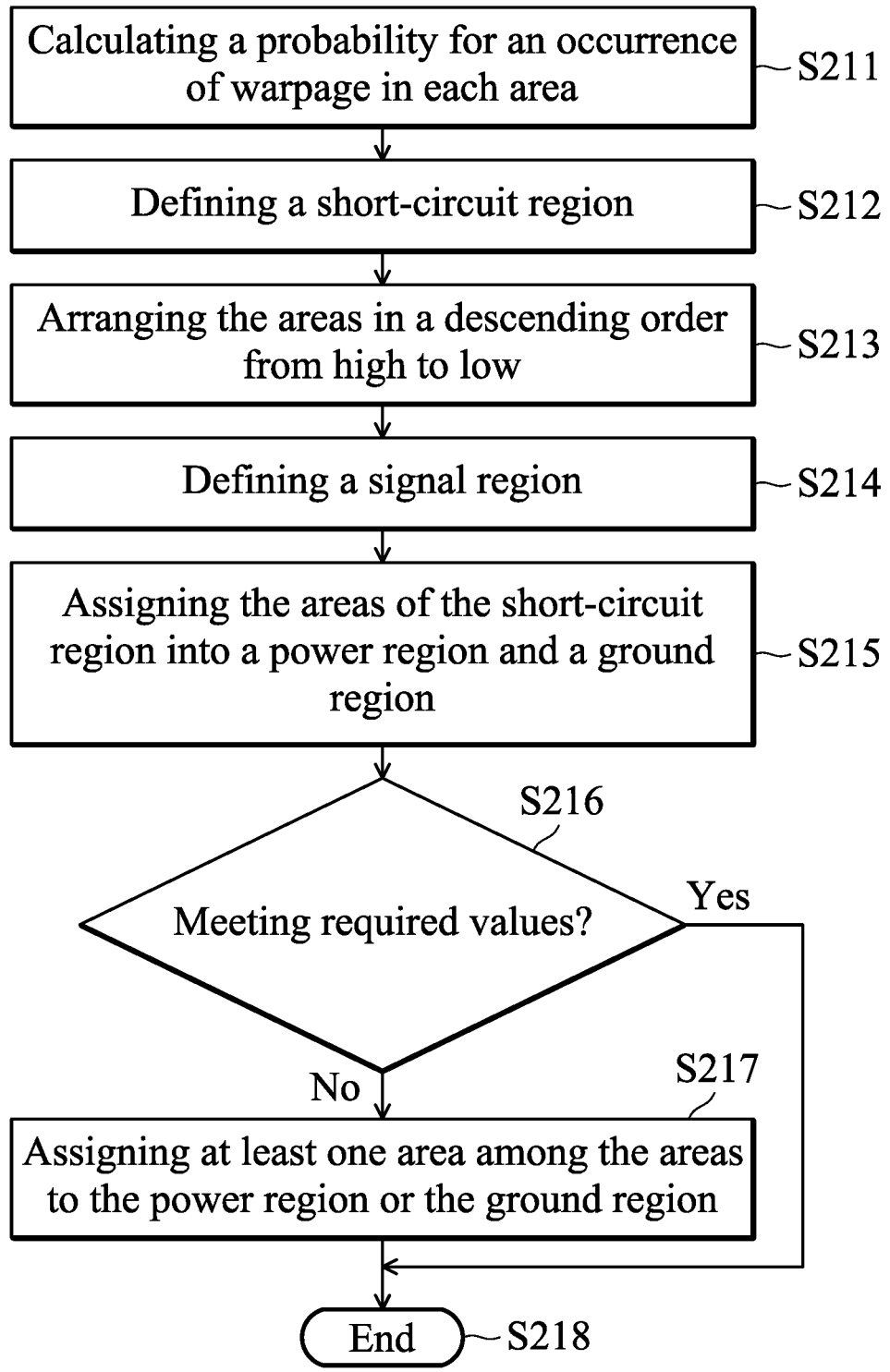
FIG. 2 is a schematic flow chart of a method of yield prejudgment and bump re-assignment according to an exemplary embodiment of the present invention.

FIG. 2 is a schematic flow chart of a method of yield prejudgment and bump re-assignment according to an exemplary embodiment of the present invention. The method of yield prejudgment and bump re-assignment is applied for a die. The die comprises a plurality of areas. Each area is electrically connected to a substrate through a bump. In an embodiment, the die comprises a plurality of metal pads, and each metal pad is electrically connected to the substrate through a bump.

Figure 3:
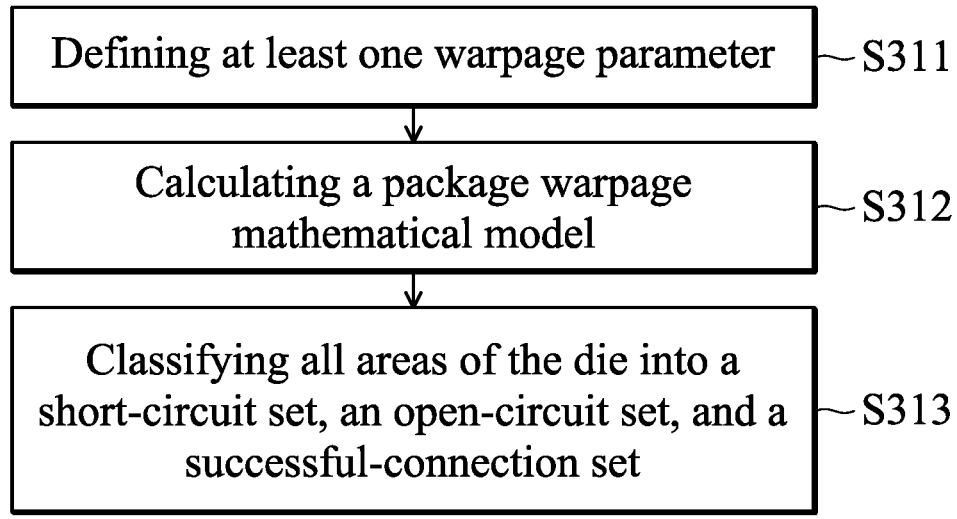
FIG. 3 is a schematic flow chart of a possible calculation of the probability of a successful connection according to an exemplary embodiment of the present invention.
Figure 4:
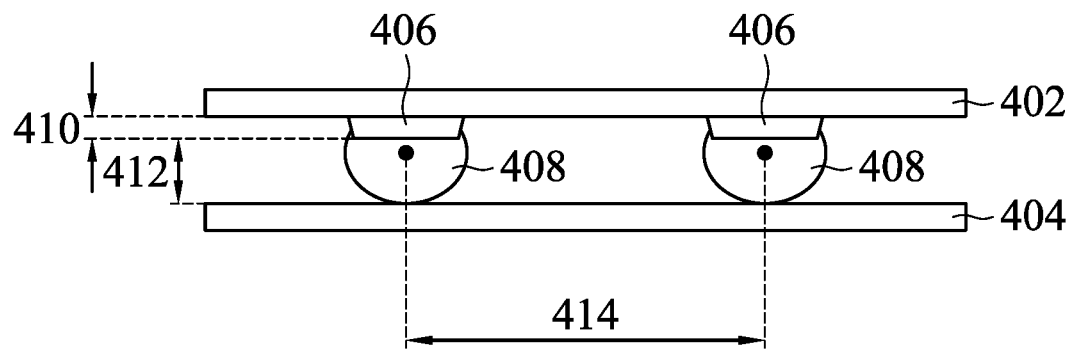
FIG. 4 shows a part of a die, a part of bumps, and a part of a substrate, but it is not intended to limit the present invention.

First, the probability that warpage will occur in each area of the die is calculated to obtain the probability of a successful connection in each area (step S211). In this embodiment, the probability of a successful connection refers to the probability that the metal pad of each area of the die is successfully connected to the substrate through the corresponding bump. The present invention does not limit how to calculate the probability of a successful connection for each area. FIG. 3 is a schematic flow chart of a possible calculation of the probability of a successful connection according to an exemplary embodiment of the present invention. First, at least one warpage parameter is defined according to the physical characteristics of the die, the substrate and the bumps (step S311). FIG. 4 is a schematic diagram of the warpage parameters of the present invention. For the clarity of the description, FIG. 4 only shows a part of the die, some of the bumps, and a part of the substrate, but it is not intended to limit the present invention. As shown in FIG. 4, a die 402 has metal pads 406. The metal pads 406 are electrically connected to a substrate 404 through bumps 408. In the embodiment, the thickness 410 of the metal pads 406 can be regarded as a first warpage parameter. The thickness 412 of the bumps 408 can be regarded as a second warpage parameter. In an embodiment, when the thickness 412 of the bumps 408 is greater, a short circuit can easily occur between one bump 408 and adjacent bumps 408 during the packaging process. When the thickness of the bumps 408 is small, an open circuit can easily occur between the bumps 408 and the substrate 404 after the packaging process.

In addition, the pitch 414 between the bumps 408 can be regarded as a third warpage parameter. In an embodiment, the pitch 414 is the distance between the center points of two bumps. When the pitch 414 is small, a short circuit can easily occur between one bump 408 and an adjacent bump. Moreover, the size of the die 402 can be regarded as a fourth warpage parameter, and the size of the substrate 404 can be regarded as a fifth warpage parameter. When the sizes of the wafer 402 and the substrate 404 are small, warpage can easily occur. In other embodiments, any factor that can cause warpage in the die can be regarded as a warpage parameter.

Then, the warpage parameters are converted into a package warpage mathematical model, and a calculation is performed to obtain the degree of warpage of each area of the die (step S312). The following is the package warpage mathematical model:

$$z = f(x,y) = ax^2 + by^2 + cx + dy + e$$

wherein, a, b, c, d, and e are constants and related to the manufacturing process. For example, in the same manufacturing process, the constants a, b, c, d, and e of the package warpage mathematical model for each die are the same. In addition, x, y, and z are the three-dimensional coordinates of each area of the die. In the embodiment, the volume of the bumps may have a 10% error, but not limited to this.

All areas of the die are classified into a short-circuit set, an open-circuit set, and a successful-connection set according to the degree of warpage of each area (step S313). In the embodiment, a short-circuit probability, an open-circuit probability, and a successful-connection probability of each area of the die can be obtained in step S312. In step S313, the areas with higher short-circuit probabilities are classified into a short-circuit set, the areas with higher open-circuit probabilities are classified into an open-circuit set, and the areas with higher successful-connection probabilities are classified into a successful-connection set.

Figure 5:
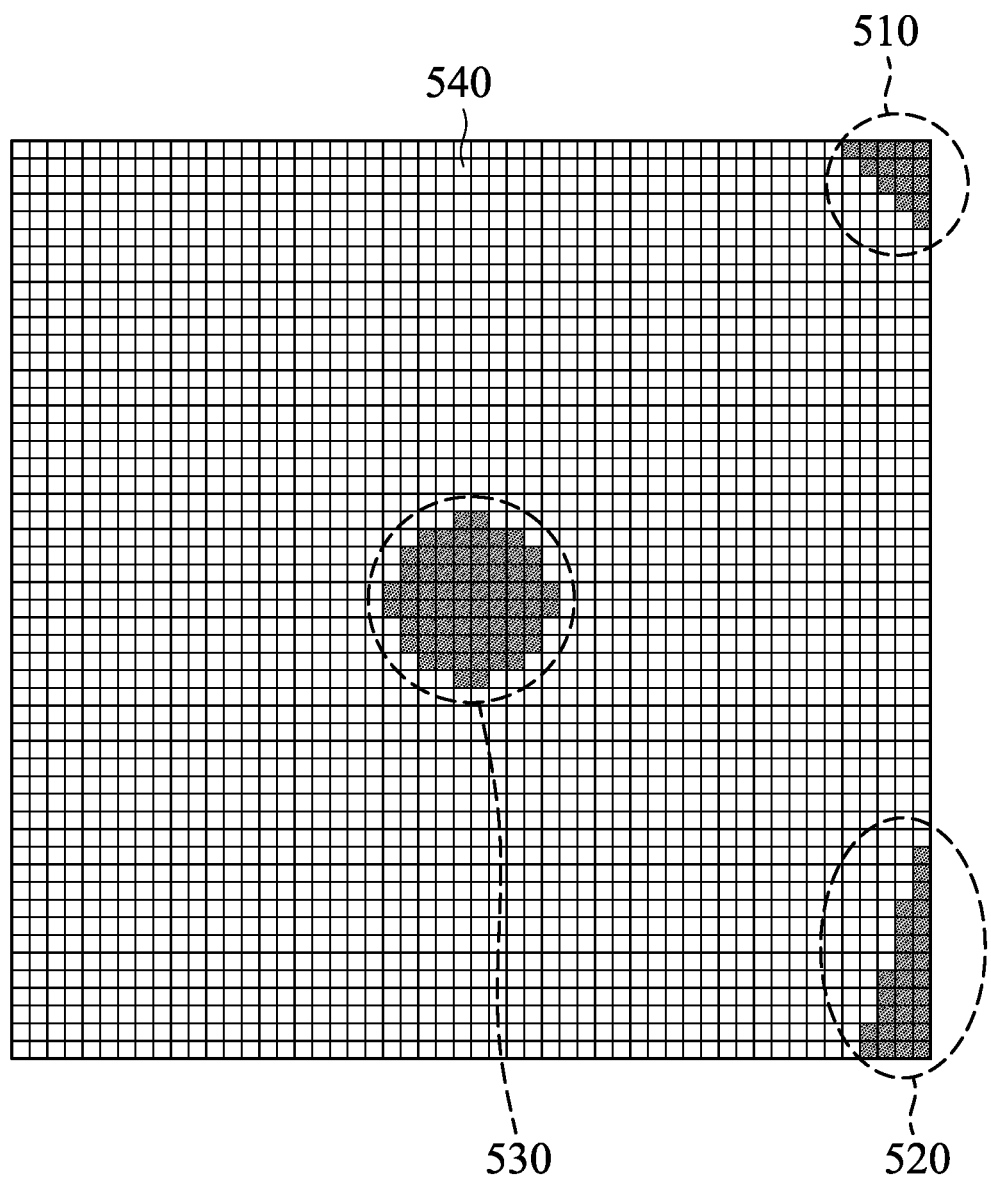
FIG. 5 is a schematic diagram of the classification of a short-circuit set, an open-circuit set, and a successful-connection set for a die.

FIG. 5 is a schematic diagram of the classification of the short-circuit set, the open-circuit set, and the successful-connection set of the die. In the embodiment, since the short-circuit probabilities of the areas located in the corner portions 510 and 520 of the die are higher, the areas located in the corner portions 510 and 520 of the die are classified into the short-circuit set. In addition, since the open-circuit probabilities of the areas located in the middle portion 530 of the die are higher, the areas located in the middle portion 530 are classified into the open-circuit set. The successful-connection probabilities of the areas located in the portion 540 of the die, outside the corner portions 510 and 520 and the middle portion 530, are higher, and the areas located in the portion 540 are classified into the successful-connection set.

Figure 6:
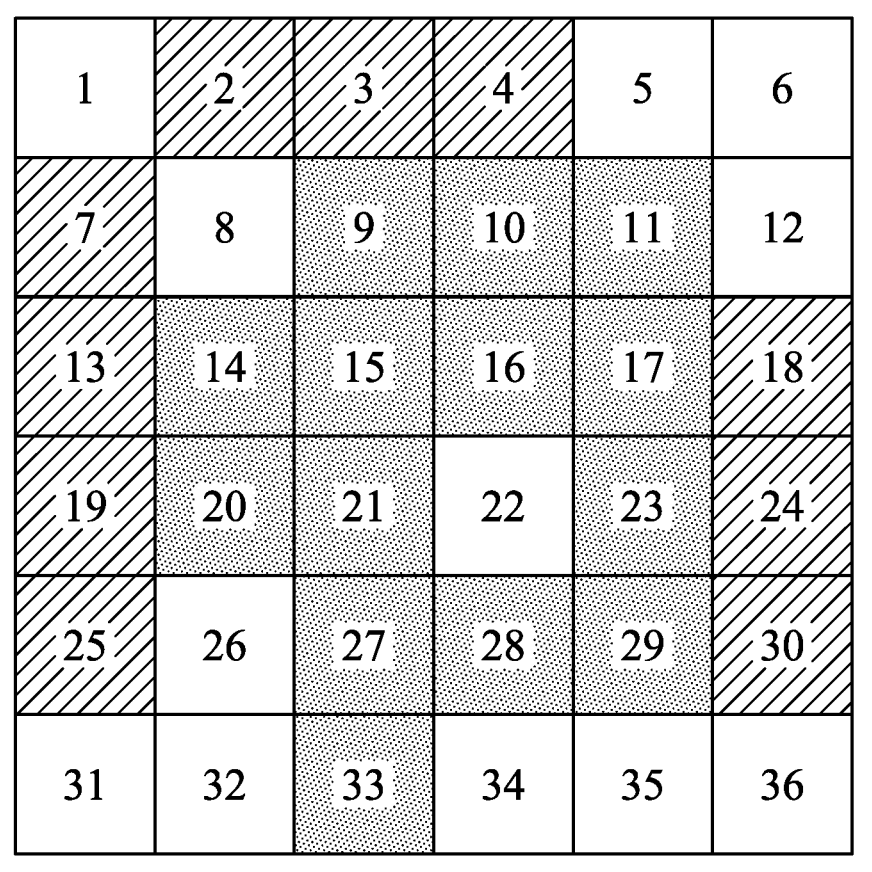

Referring back to FIG. 2, then, areas whose successful-connection probabilities are not within a predetermined range are defined as a short-circuit region (step S212). FIG. 6 is a schematic view of the areas of the die according to an exemplary embodiment. Assuming that the successful-connection probabilities of the areas 2~4, 7, 13, 18, 19, 24, 25, and 30 are not in the predetermined range and the areas 2~4, 7, 13, 18, 19, 24, 25, and 30 are defined as a short-circuit region. According to other embodiments, in step S212, the short-circuit region is further more modulated. In an embodiment, the regions 2~4 are located on the upper edge of the die, and the regions 2~4 modulated to a first module. The areas 7, 13, 19, and 25 are located at the left edge of the die and modulated to a second module, while the regions 18, 24, and 30 are located at the right edge of the die and modulated to a third module. In the embodiment, since the first, second and third modules are not adjacent to each other, short circuits do not occur between the bumps corresponding to the first module and the bumps corresponding to the second or third module in the packaging process. Similarly, short circuits do not occur between the bumps corresponding to the second module and the bumps corresponding to the bumps corresponding to the third module. Therefore, the circuit layout designer can configure power traces with different voltage levels in different modules. For example, the circuit layout designer configures a power trace transmitting a voltage with a first level in an area in the first module (such as area 2, 3, or 4) and configures a power trace transmitting a voltage with a second level in an area of the second module (such as 7, 13, 19, or 25). In this case, the first level is different from the second level. For example, the first level is a high voltage level, the second level is a ground level.

Excluding the areas of the short-circuit region and the areas located at the corners of the die, the remaining areas are arranged in a descending order from high to low according to the successful-connection probabilities of the remaining areas (step S213). In the embodiment, since the areas 2~4, 7, 13, 18, 19, 24, 25, and 30 belong to the short-circuit region, the arrangement of step S213 is not performed on the areas 2~4, 7, 13, 18, 19, 24, 25, and 30. Moreover, since the areas 1, 6, 31, and 36 are located at the corners of the die, the arrangement of step S213 is also not performed on the areas 1, 6, 31, and 36. Excluding the short-circuit region and the corner regions, the remaining areas are areas 8~12, 14~17, 20~23, 26~29, and 32~35. In step S213, the remaining areas are arranged in the descending order from high to low according to the successful-connection probabilities. Assuming that the areas from the highest successful-connection probability to the lowest successful-connection probability of successful connection are 15, 16, 10, 23, 28, 27, 21, 33, 29, 20, 9, 17, 11, 14, 8, 26, 32, 34, 13, 18, 24, 7, 25, 22, 30, and 2. In other embodiments, the remaining areas may be arranged in ascending order from low to high according to the successful-connection probabilities of the remaining areas.

From the areas arranged in the descending order, some areas are selected and defined as a signal region (step S214). In an embodiment, the areas whose successful-connection probabilities are greater than a predetermined value are defined as a signal region. Assume that the die requires thirteen areas serving as bumps for transmitting signals. In the embodiment, the first thirteen areas (such as the areas 15, 16, 10, 23, 28, 27, 21, 33, 29, 20, 9, 17, and 11) arranged according to the descending order are defined as the signal region. In another embodiment, when the areas are arranged in ascending order from low to high, the last thirteen areas are selected and defined as a signal region.

The areas of the short-circuit region are divided into at least one power region and at least one ground region (step S215). In an embodiment, the first module composed of the areas 2~4 and the third module composed of the areas 18, 24, and 30 belong to the power region, and the second module composed of the areas 7, 13, 19, and 25 belong to the ground region, however, it is not intended to limit the present invention. In other embodiments, the first module is defined as a first power region, the second module is defined as a second power region, and the third module is defined as a ground region, wherein the level of the power transmitted by the first power region may be the same or different from the level of the power transmitted by the second power region.

It is determined whether the number of areas in the power region is less than a first required value and whether the number of areas in the ground region is smaller than a second required value (step S216). In an embodiment, the first required value is the number of power bumps required by the die, and the second required value is the number of ground bumps required by the die.

When the number of regions in the power region is less than the first required value or when the number of regions in the ground region is less than the second required value, at least one area among the areas which are arranged in step S213 is assigned to the power region or the ground region (step S217). Assume that the die requires nine areas for the power bumps to transmit power and nine areas for the ground bumps to transmit ground voltage. In the example, both the first and second required values are equal to nine.

As described above, the first and third modules belong to the power region, and there are six areas in the first and third modules. However, the die requires nine areas for the power bumps. Thus, three areas among the areas which are arranged in step S213 are selected and assigned to the power region. In an embodiment, the three areas arranged behind (such as the areas 14, 26, and 34) are assigned to the power region. In addition, the second module belongs to the ground region, and there are four areas. However, the die requires nine areas for the ground bumps. Thus, five areas among the areas which are arranged in step S213 are selected and assigned to the ground region. In an embodiment, the areas 8, 32, 12, 5 and 35 are assigned to the ground region. In other embodiments, the area that has been assigned to the power region cannot be assigned to the ground region.

In other embodiments, at least one region among the areas which are arranged in step S213 is selected to serve as a dummy in step S217. In an embodiment, the corner areas (such as the areas 1, 6, 31, and 31) of the die serve as dummy areas in step S217.

When the number of areas of the power region and the number of areas of the ground region meet the first and second required values, respectively, the area configuration of the die is completed (step S218). In this embodiment, the conditions related to the known or expected warpage and unevenness are numerically analyzed through the method of yield prejudgment and bump re-assignment shown in FIG. 2 to obtain the probabilities of the occurrence of an open circuit, a short circuit, or a successful connection for each of the all positions in the die and further obtain an open-circuit set, a short-circuit set, and a successful-connection set. The positions of the bumps are re-assigned by using the three sets, such that the bumps can be utilized adequately in functions in the condition in which warpage or unevenness occurs, such as when the bump is utilized as a ground or to transmit a signal.

For example, a circuit layout designer of the die obtains the probability of a successful connection in each area of the die according to the method of yield prejudgment and bump re-assignment shown in FIG. 2. Accordingly, the circuit layout designer arranges the signal lines of the circuit in the signal region and arranges the power traces thereof in the short-circuit region in advance. Thus, even in the packaging process, the transmission of the signals and power is not affected by the occurrence of a warpage phenomenon.

Yield prejudgment and bump re-assignment methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of yield prejudgment and bump re-assignment for a die, the die comprising a plurality of areas, each area being electrically connected to a substrate through a bump, and the method comprising:
   calculating a probability for an occurrence of warpage in each area to obtain a successful-connection probability for the area;
   defining some of the areas as a short-circuit region according to the successful-connection probabilities, wherein the successful-connection probabilities of the areas of the short-circuit region are not within a predetermined range;
   arranging the areas excluding the areas of the short-circuit region and the areas located at corners of the die in a descending order from high to low according to the corresponding successful-connection probabilities;
   defining some of the areas which are arranged in the descending order as a signal region, wherein the successful-connection probabilities of the areas of the signal region are greater than a predetermined value;
   dividing the short-circuit region into at least one power region and at least one ground region;
   determining whether the number of areas in the power region is less than a first required value and whether the number of areas in the ground region is less than a second required value;
   when the number of areas in the power region is less than the first required value, assigning at least one area among the areas arranged in the descending order to the power region, wherein the successful-connection probability of the area assigned to the power region is less than the predetermined value; and
   when the number of areas in the ground region is less than the second required value, assigning at least one area among the areas arranged in the descending order to the ground region, wherein the successful-connection probability of the area assigned to the ground region is less than the predetermined value.

2. The method as claimed in claim 1, wherein calculating the probability for the occurrence of warpage in each area to obtain the successful-connection probability for the area comprises:
   calculating a degree of warpage for each of the areas according to physical characteristics of the die, the substrate, and the bumps.

3. The method as claimed in claim 2, wherein the physical characteristics of the die comprise a size of the die and thickness of metal pads.

4. The method as claimed in claim 2, wherein the physical characteristics of the substrate comprise a size of the substrate.

5. The method as claimed in claim 2, wherein the physical characteristics of the bump comprise pitches of the bumps and thickness of the metal pads.

6. The method as claimed in claim 2, wherein calculating the probability for the occurrence of warpage in each area to obtain the successful-connection probability for the area further comprises:
   calculating a probability that each area is successfully connected to the substrate through the corresponding bump according to the degree of warpage and volume of the bumps to obtain the successful-connection probability.

7. The method as claimed in claim 1, wherein dividing the short-circuit region into the power region and the ground region comprises:
   modulating the areas of the short-circuit region to obtain a first module and a second module, wherein the areas of the first module are adjacent to each other, and the areas of the second module are adjacent to each other;
   defining the areas of the first module as the power region; and
   defining the areas of the second module as the ground region.

8. A computer-readable storage medium storing a computer program to perform a method of yield prejudgment and bump re-assignment to define functions for a plurality of pumps, the pumps being electrically connected to a plurality of areas of a die and a substrate, and the method comprising:
   calculating a probability for an occurrence of warpage in each area to obtain a successful-connection probability for the area;
   defining the areas whose successful-connection probabilities are not within a predetermined range as a short-circuit region;
   arranging the areas excluding the areas of the short-circuit region and the areas located at corners of the die in a descending order from high to low according to the corresponding successful-connection probabilities;
   defining the areas whose successful-connection probabilities, among the areas arranged in the descending order, are greater than a predetermined value as a signal region;
   dividing the short-circuit region into at least one power region and at least one ground region;
   determining whether the number of areas in the power region is less than a first required value and whether the number of areas in the ground region is less than a second required value;
   when the number of areas in the power region is less than the first required value, assigning at least one area whose successful-connection probabilities is less than the predetermined value, among the areas arranged in the descending order, to the power region; and
   when the number of areas in the ground region is less than the second required value, assigning at least one area whose successful-connection probabilities is less than the predetermined value, among the areas arranged in the descending order to the ground region.

9. The computer-readable storage medium as claimed in claim 8, calculating the probability for the occurrence of warpage in each area to obtain the successful-connection probability for the area comprises:

calculating a degree of warpage of each of the areas according to physical characteristics of the die, the substrate, and the bumps to obtain the successful-connection probability.

10. The computer-readable storage medium as claimed in claim 8, wherein the physical characteristics of the die comprise a size of the die and thickness of the metal pads, the physical characteristics of the substrate comprise a size of the substrate, and the physical characteristics of the bump comprise pitches of the bumps and the thickness of the metal pads.

* * * * *